(12) United States Patent
Scholich-Tessmann

(10) Patent No.: US 7,869,898 B2
(45) Date of Patent: Jan. 11, 2011

(54) AXIS CONTROL METHOD

(75) Inventor: Wolfgang Scholich-Tessmann, Boeblingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 216 days.

(21) Appl. No.: 12/171,774

(22) Filed: Jul. 11, 2008

(65) Prior Publication Data

US 2009/0012639 A1    Jan. 8, 2009

Related U.S. Application Data

(63) Continuation of application No. PCT/EP2006/000293, filed on Jan. 14, 2006.

(51) Int. Cl.
*G06F 19/00* (2006.01)
(52) U.S. Cl. ...................... 700/192; 700/193
(58) Field of Classification Search .................. 700/61, 700/192, 193
See application file for complete search history.

(56) References Cited

U.S. PATENT DOCUMENTS

| | | | |
|---|---|---|---|
| 5,109,148 A | 4/1992 | Fujita et al. | |
| 5,451,850 A * | 9/1995 | Karakama | 318/568.11 |
| 5,452,275 A | 9/1995 | Ogawa | |
| 5,604,677 A * | 2/1997 | Brien | 700/186 |
| 5,801,939 A | 9/1998 | Okazaki | |

FOREIGN PATENT DOCUMENTS

EP    1 143 315    10/2001

OTHER PUBLICATIONS

English machine translation of International Search Report from corresponding PCT Application No. PCT/EP2006/000293, mailed Aug. 4, 2006, 9 pages.
English machine translation of International Preliminary Report on Patentability from corresponding PCT Application No. PCT/EP2006/000293, mailed Jul. 24, 2008, 10 pages.

* cited by examiner

*Primary Examiner*—Ryan A Jarrett
(74) *Attorney, Agent, or Firm*—Fish & Richardson P.C.

(57) ABSTRACT

Methods and devices are provided for adjusting the relative position and/or relative movement between a workpiece and a tool of a machine tool in the direction of an axis. An actuating variable for a basic axis comprising one or more drives is generated in the first controller of a basic axis control system, an actuating variable for a higher-dynamic additional axis comprising a drive is generated in a second controller of an additional axis control system, and a third actuating variable, which is fed both to the additional axis control system and to the basic axis control system, is generated in a third controller.

16 Claims, 5 Drawing Sheets

AXIS CONTROL METHOD

CROSS REFERENCE TO RELATED APPLICATION

This application is a continuation of, and claims priority under 35 U.S.C. §120 to PCT/EP2006/000293, filed on Jan. 14, 2006, and designating the U.S., which is hereby incorporated by reference in its entirety.

TECHNICAL FIELD

The invention relates to a method for adjusting the relative position and/or the relative movement between a workpiece and a tool of a machine tool in the direction of an axis, by generating an actuating variable for a basic axis in a first controller of a basic axis control system and generating an actuating variable for at least one higher-dynamic additional axis in a second controller of an additional axis control system. The invention also relates to a machine tool for performing the method.

BACKGROUND

In machine tools, tool holders, which may hold tools or laser processing heads, for example, are moved in a specific axis direction by means of drives and, in some cases, intervening mechanical components such as gears or portals to which the tool holder or the laser processing head can be fixed. This axis direction is often referred to as the tool axis or simply the axis. Alternatively or additionally, it is possible to move a workpiece by means of a drive in a specific axis direction. This is often abbreviated to workpiece axis or simply to axis. Since the processing result corresponds to the relative movement between tool and workpiece, it is not important whether the tool or the workpiece is moved.

If two drives are present which act in the same axis direction, then one drive, which often has lower dynamics, is typically referred to as the main or fundamental axis and the second drive, which often has higher dynamics, is typically referred to as the additional axis. A further frequently used term is "basic axis." A basic axis can comprise one or more fundamental axes, with a relatively low dynamics, acting in a resultant overall direction.

Basic axes on machine tools are often very large, because they have to move other axes and built-on accessories. This leads to large moved masses and low mechanical characteristic frequencies. The dynamics of these basic axes are therefore very limited, both with regard to the achievable speeds and accelerations, and with regard to control circuit dynamics and thus the dynamic axis accuracy. On the other hand, the basic axes enable large traverse paths. If these basic axes are used in order to keep the distance of a processing head from a workpiece constant, this distance control exhibits a very limited control circuit dynamics.

If a short-stroke additional axis is fitted close to the so-called tool center point (TCP) in order to control the distance from the workpiece, this axis has to move only relatively small masses and can therefore perform rapid movements and achieve high control circuit dynamics. On machines with, for example, five degrees of freedom, a position change of the additional axis, which changes the distance of the TCP from a workpiece, acts like a variable tool length. This has an unfavorable influence on the path accuracy of the machine.

U.S. Pat. No. 5,801,939 discloses an apparatus with a device for rough positioning (basic axis) and a device for fine positioning (additional axis). A summing element adds up the movements caused by the two devices. A detection element generates a signal describing the overall movement. The signal is compared with a setpoint value and the deviation (control error of the axis assembly) is transmitted as an input signal to the two devices. The actual value of the additional axis is not measured. Instead, the control error of the axis assembly plus a proportion of the simulated additional axis position is transmitted to the basic axis.

U.S. Pat. No. 5,109,148 describes a positioning device, which comprises two independent drives for adjusting the relative position between a tool and a workpiece. For this purpose, the device comprises two position control circuits independent of one another. The first control circuit for the lower-dynamic drive (basic axis) receives bandwidth-limited positional setpoint values via a filter and with these roughly adjusts the desired position (relative position), i.e., within the scope of its limited dynamics. The positioning components which the basic axis cannot perform dynamically are transmitted to the second control circuit (additional axis).

SUMMARY

The present disclosure features a method and a device, in which both the high dynamics of the additional axis and the large traverse paths of the basic axes are used in order to produce the desired movement of the tool center point (TCP) and at the same time achieve a high path accuracy of the machine.

In the methods and devices disclosed herein, a third actuating variable, which is fed both to the additional axis control system and to the basic axis control system, is generated in a third controller. The control of the overall system and the coordination of the two axes can thus be decoupled. Moreover, this allows the control bandwidths of the first and second controller to be added together. The basic axis and the additional axis are connected mechanically one behind the other, and as a result the movement of the basic axis results from the simultaneous movement of a plurality of fundamental axes.

The controller of the basic axis control system (the first controller) ensures that the basic axis achieves large traverse paths when required within the scope of its dynamic limits. The controller of the additional axis control system (the second controller) produces a high dynamics and control bandwidth, and thus a high accuracy. The method according to the invention can be used for example for a distance control. The method can also be used in each case on a plurality of axis pairs, each axis pair comprising a basic axis and an additional axis. A two dimensional movement of a tool can be effected by the combination of the axes in both directions, resulting in a path operation. The cooperating pairs should generally have similar dynamics, and may in some implementations be geared to one another.

In a preferred variant of the method, provision can be made such that the actuating variable is determined in the third controller in such a way that the tool or workpiece disposed on the additional axis assumes a preset position, preferably a central position, with respect to its traverse path on the additional axis. The tool or workpiece moved by the additional axis thus deviates in the steady state as little as possible from the preset position. As a result of this measure, the path accuracy of the machine is improved.

It is particularly preferable if an actual value of the additional axis is determined and fed to the third controller. As a result of the fact that only the measured actual value is used in the third controller for the control of the basic axis speed, the average deflection of the tool or workpiece movable by the additional axis can be regulated to a fixed value, for example the central position of the additional axis.

In some implementations, the actuating variable of the third controller is fed diametrically opposed to the basic axis control system and to the additional axis control system. The third controller can thus change the position of the tool disposed on the additional axis without influencing the distance of the tool from the workpiece. This allows the third controller to adjust statically a constant position of the tool or workpiece movable by the additional axis. In other words, it is possible to adjust a secondary condition for the additional axis (e.g., so that the additional axis is in the central position when in the steady state), without significantly influencing the superordinate control.

In particular, this is possible due to the fact that the actuating variable of the first controller and of the third controller are added up in the basic axis control system and the sum is fed as a resultant actuating variable to the basic axis, and due to the fact that the actuating variable of the third controller is subtracted from the actuating variable of the second controller in the additional axis control system and the difference is fed as a resultant actuating variable to the additional axis.

In an advantageous variant of the method, provision can be made such that a setpoint value is given for the relative position and/or relative movement, an actual value for the relative position and/or relative movement is detected or determined and the difference between the setpoint and actual values (deviation) is fed as an input variable to the first and second controller. Still further variables can enter into the measured actual value, such as for example the positions of the basic axis and the additional axis and the deviation between the part geometry and the numerical control (NC) program mapping the part geometry.

It is particularly preferable if the first and second controllers perform a position control and the third controller performs a follow-up-control. With this follow-up-control, it is possible to regulate the additional axis in the steady state to a preset position. Through the cooperation of the three controllers, it is possible to achieve a large traverse path with at the same time high dynamics and accuracy. The additional axis has a small traverse path and a constant position in the steady state.

If the first controller is parameterized more weakly than the basic axis permits, the position control of the basic axis is used to filter setpoint-value components that cannot be performed by the first controller. A "weakly" adjusted position control represents a low pass. The position controller is in any case present. A separate low-pass, such as is provided in the prior art, can therefore be dispensed with. Amongst other things, this also dispenses with parameterization of the first controller.

In a variant of the method, provision can be made such that, on the basis of the resultant actuating signal for the basic axis, a transformation for distributing the basic axis movement to a plurality of fundamental axes is carried out. For example, by means of an NC control, the movement to be performed by the basic axis can be distributed by a suitable transformation to a plurality of fundamental axes and their drives can be controlled in such a way that the desired movement of the basic axis occurs.

The present disclosure also features a machine tool that includes a basic axis control system, comprising a first controller for determining an actuating variable for a basic axis comprising one or more drives for the movement of a tool or a workpiece in an axis direction, and an additional axis control system, comprising a second controller for determining an actuating variable for an additional axis comprising at least one drive for the movement of a tool or workpiece in the same axis direction. A third controller is provided for generating a third actuating variable, which is fed both to the basic axis control system and to the additional axis control system.

In some implementations, the additional axis, for example for controlling the distance of a processing head from a workpiece, is fitted close to the TCP of an axis of the machine and acts in the same direction as the movement which arises from the movement of one or more basic axes of the machine. (The basic axes do not have to act in the same direction). This additional axis has a relatively small traverse path, but on the other hand high dynamics. The distance between the tool (processing head) and the workpiece can be changed by a movement of the basic axis with a large stroke, but low dynamics and accuracy. Alternatively or additionally, the distance can be changed by a movement of the additional axis which, whilst having only a small traverse path, has a high dynamics. The overall control for the basic axis and the additional axis forms, as it were, a high-/low-pass filter for the actuating variable. The dynamics of the basic axis and the additional axis thus supplement one another. The basic axis is more strongly attenuated. For time-optimal processing, it is possible to switch temporarily between different operating modes: only basic axis, only additional axis or coupled operation.

In a preferred embodiment, a device for measuring the actual value of the additional axis can be provided, which feeds an actual variable of the additional axis control system to the third controller. It is thus possible to regulate the additional axis, more precisely a tool or workpiece moved by it, to a preset position along its traverse path.

The first and second controllers are preferably designed as position controllers and the third controller as a follow-up-controller. Within the scope of the dynamic possibilities, it is possible to react directly to distance deviations between workpiece and tool by means of the position controller of the basic axis control system. Since the bandwidth of the basic axis control system is very limited, the accuracy of the basic axis movement remains low, but the basic axis achieves large-stroke movement components.

The distance or overall position deviation is also fed to the position controller of the additional axis control system. The movement of the additional axis acts in the same direction as the movement of the basic axis. The basic axis and the additional axis are thus connected mechanically one behind the other. Their movement components are added up at the TCP. The position controller of the additional axis control system enables a high bandwidth of the overall control.

The follow-up-controller acts diametrically opposed to the basic axis control system and the additional axis control system. It can thus change, for example, the position of the workpiece disposed on additional axis, without the distance of the tool from the workpiece being influenced. This thus allows the follow-up-controller to adjust a constant position of the additional axis in the steady state. Moreover, the follow-up-controller acts in a limiting fashion on the stroke that the additional axis has to perform.

For this purpose, the basic axis control system preferably comprises a first combination element, in which an actuating variable for the basic axis is determined from the actuating variables of the first controller and the third controller, and the additional axis control system comprises a second combination element, in which an actuating variable for the additional axis is determined from the actuating variables of the second and third controller.

In a preferred embodiment, a comparison device can be provided which generates a deviation between a setpoint value and an actual value and feeds the deviation value (representing the control error) to the basic axis control system and the additional axis control system. The control error is thus transmitted to both control systems and both control systems seek to reduce the error.

In an advantageous embodiment of the invention, a device for measuring the actual value of the basic axis can be provided, which is connected to an element for determining the actual value of the overall relative position (distance between the workpiece and the tool), said element also being connected to the device for measuring the actual value of the additional axis. The actual value of the overall relative position is then fed to the comparison device. Optimum feedback is thus ensured, taking account of the position of the basic axis and the additional axis as well as any additional influencing variables, such as for example a deviation between the actual height profile of a workpiece and that stored in the NC program.

The details of one or more embodiments of the invention are set forth in the accompanying drawings and the description below. Other features and advantages of the invention will be apparent from the description and drawings, and from the claims.

DETAILED DESCRIPTION

FIGS. 1-5 illustrate different machine tools having various axes arranged in different configurations. These machine tools are examples of different types of machine tools in which a third controller can be utilized as discussed above. In these machine tools, the basic axis and the additional axis can be connected mechanically one behind the other, as will be discussed in further detail below.

Figure 1:
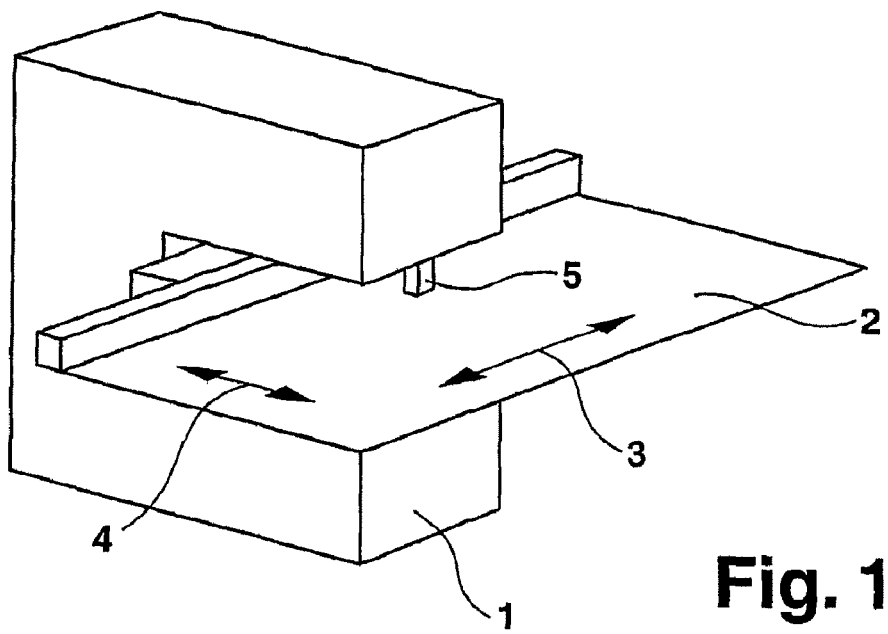
FIG. 1 shows a first machine tool with a workpiece movable along two axis directions.

FIG. 1 shows a machine tool 1, and a workpiece 2 that is movable by the machine tool 1 along axis directions 3, 4. The machine tool 1 includes a tool holder 5, which can accommodate a tool (not shown), and which is also movable in axis direction 4. Drives for the workpiece, which act in axis directions 3, 4, and mechanical components possibly co-operating therewith, can be referred to as workpiece axes. The drive of tool holder 5, which acts in axis direction 4, can be referred to as a machine axis.

Figure 2:
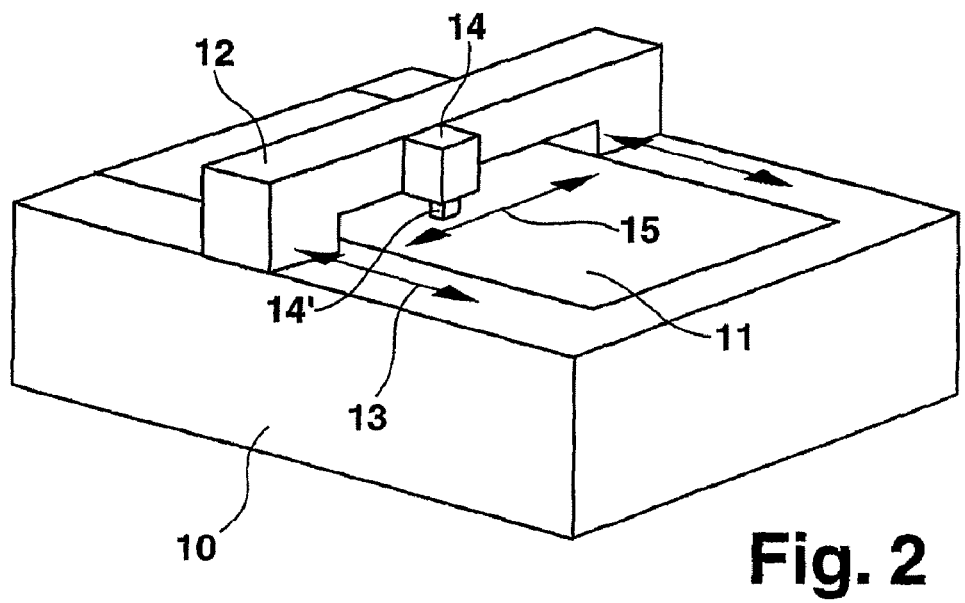
FIG. 2 shows a machine tool with a tool movable in two axis directions.

FIG. 2 shows a further machine tool 10, in which a workpiece 11 is fixedly disposed. A portal 12 is movable along axis direction 13 (basic axis) by a drive (not shown) acting on portal 12. Disposed on portal 12 is a device 14, on which a tool holder 14' is in turn disposed. Accordingly, tool holder 14' is moved in direction 13 by portal 12. Device 14 (and therefore the tool holder 14' and the tool (not shown) which it carries) is also movable with respect to portal 12 in axis direction 15. Device 14 has a smaller mass than portal 12, and therefore movements of the device 14 in axis direction 15 can be performed more quickly than movements of the portal in axis direction 13. Tool holder 14' is also mobile with respect to device 14, and thus relative to portal 12, in axis direction 13. As a result, high-dynamic movements in axis direction 13 (in this case considered to be an additional axis) can be performed by tool holder 14'. In this implementation the additional axis (movement of tool holder 14' relative to device 14) would be arranged mechanically behind the basic axis (movement of portal 12 along axis direction 13).

Figure 3:
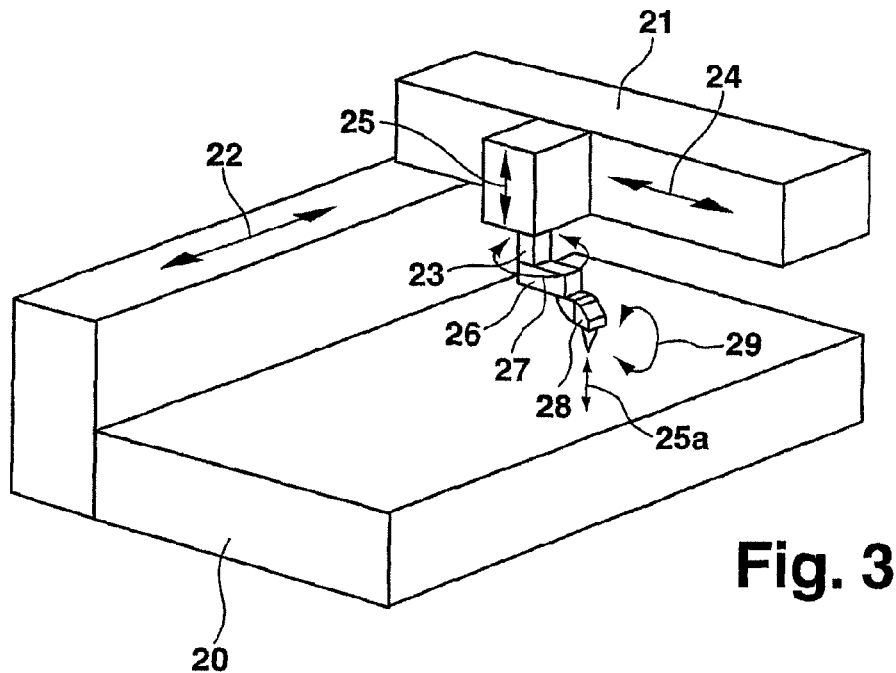
FIG. 3 shows a machine tool with five axis directions.

FIG. 3 shows a machine tool 20, in which an arm 21 is movable along axis direction 22. A device 23 is movable along arm 21 in axis direction 24. Device 23 is additionally movable in axis direction 25. The X-, Y-, Z-directions of a Cartesian coordinate system are defined by axis directions 22, 24, 25. An extension arm 26 is rotatable in axis direction 27. Disposed on extension arm 26 is a laser cutting head 28, which in turn is rotatable in axis direction 29. The axes described hitherto by reference to FIGS. 1-3 represent basic axes.

In all the machines of FIGS. 1-5, additional axes are considered to be all axes which permit a relative movement between the TCP and the workpiece in the direction of a basic axis and thereby exhibit a higher dynamics than the basic axes. These are preferably tool axes with a low weight in the proximity of the TCP, or workpiece axes with a low weight.

Referring to FIG. 3, an additional axis can be provided, for example, by a length change of extension arm 27, or an orientation change of head 28 about axis 29, which leads to a translation of the TCP. A short, high dynamic movement in axis direction 29 can be considered as an additional axis with respect to axis 24. In the case of small angles, the orientation error on the workpiece is negligible. In the case of a distance control, the additional axis would generally have to act in the beam exit direction 25a.

Figure 4:
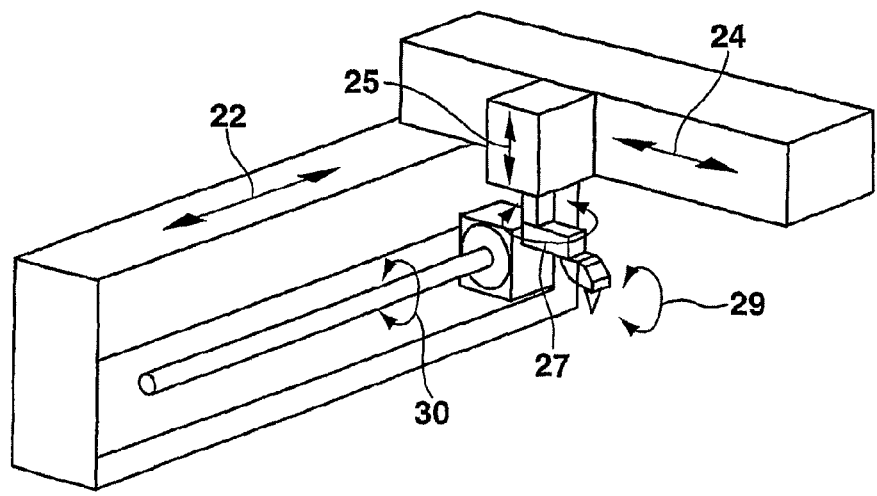
FIG. 4 shows a machine tool with six axis directions.

The representation of FIG. 4 is similar to that of FIG. 3, in that the same axis directions 22, 24, 25, 27, 29 are provided. In addition, an axis direction 30 is provided, about which a workpiece can be turned.

Figure 5:
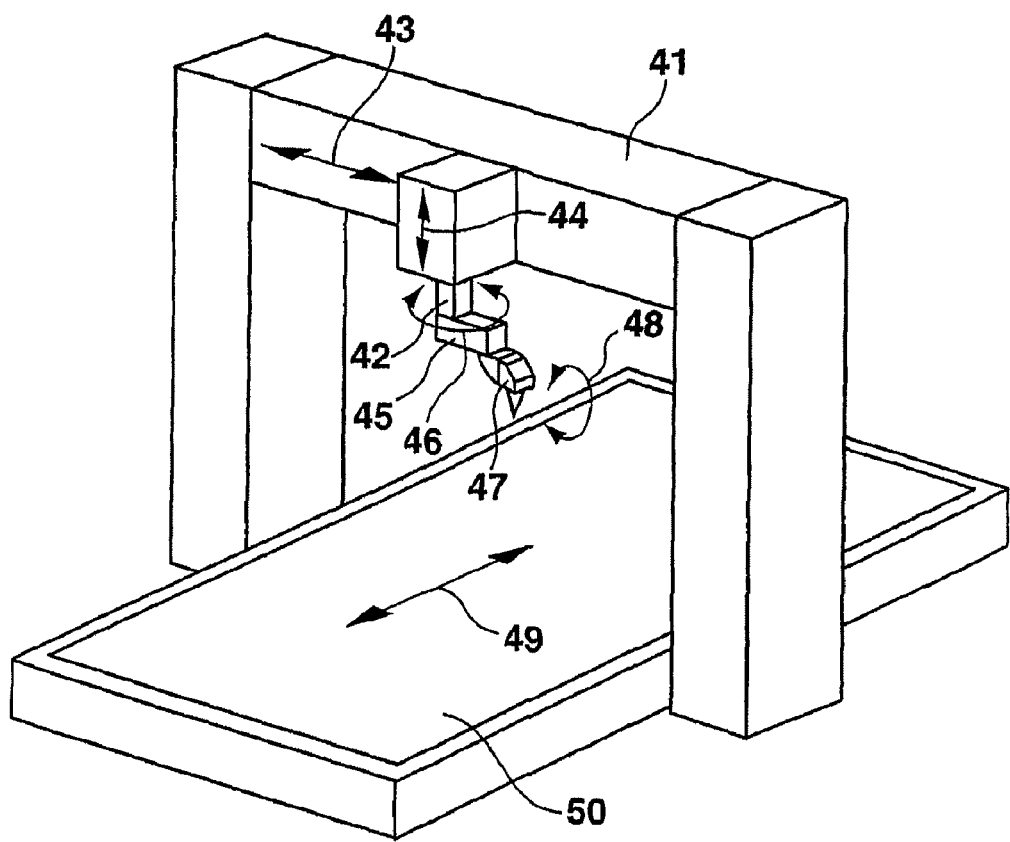
FIG. 5 shows a machine tool with four axis directions and a movable workpiece.

A further embodiment of a machine tool is shown in FIG. 5. A device 42 is movable on a portal 41 in axis direction 43. Device 42 is in turn adjustable in height in axis direction 44. Extension arm 45 is rotatable in axis direction 46 and laser cutting head 47 is rotatable in axis direction 48. Drives acting in axis directions 43, 44, 46, 48 can be referred to as machine axes, whilst a drive acting in axis direction 49 can be referred to as a workpiece axis, since workpiece 50 is movable along this axis. A basic axis, for example, is thus produced. In the case of a machine tool in the manner of the invention, at least a second adjustment facility must be present with respect to an axis direction (which can emerge as the resultant of several basic axis directions). In FIG. 5, this could be achieved by the fact that portal 41 is also movable in axis direction 49. In implementations in which portal 41 is movable in direction 49 at higher dynamics, this movement would be considered to be an additional axis.

In this implementation, device 42 and extension arm 45 are movable in direction 43 (the basic axis) and cutting head 47 is movable along the extension arm 45 in direction 43 (an additional axis). Hence, a movement of device 42 also results in a movement of laser cutting head 47 and the movement of laser cutting head 47 relative to extension arm 45 adds to the first movement.

It should be stressed that the solution according to the invention is not tied to any special arrangement of the tool or workpiece axes.

Figure 6:
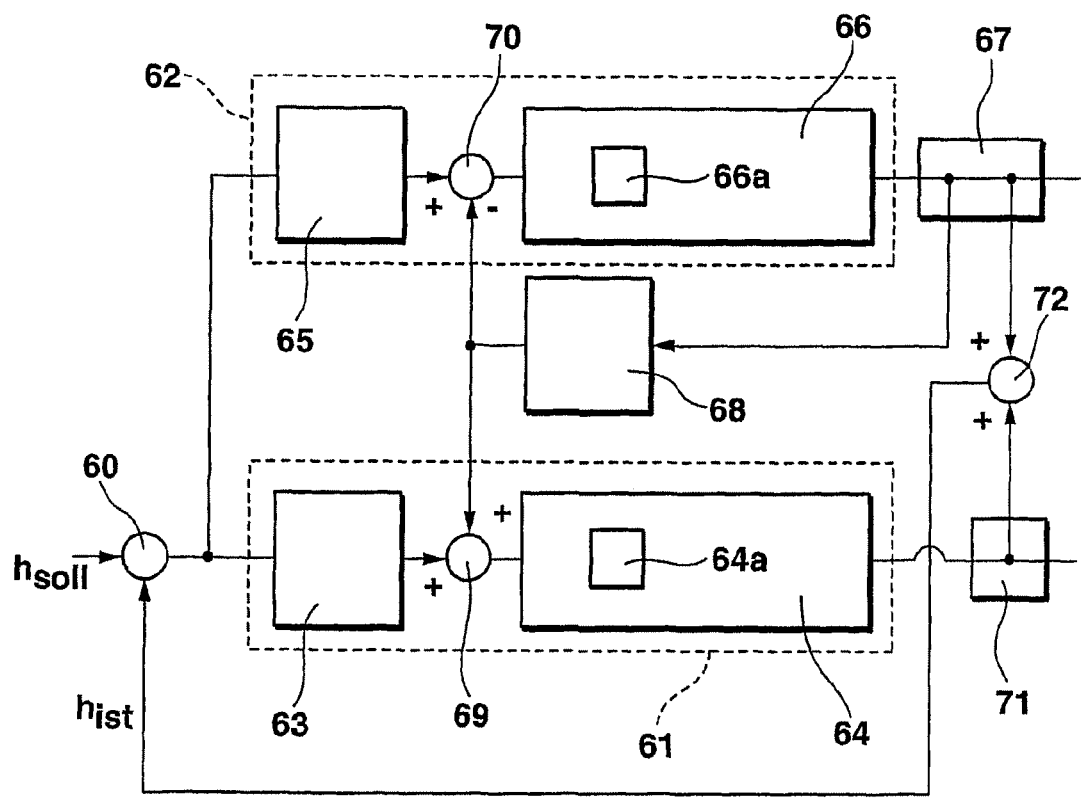
FIG. 6 shows a block diagram to illustrate the control concept for a basic axis and an additional axis not taking account of additional influencing variables.
Figure 7:
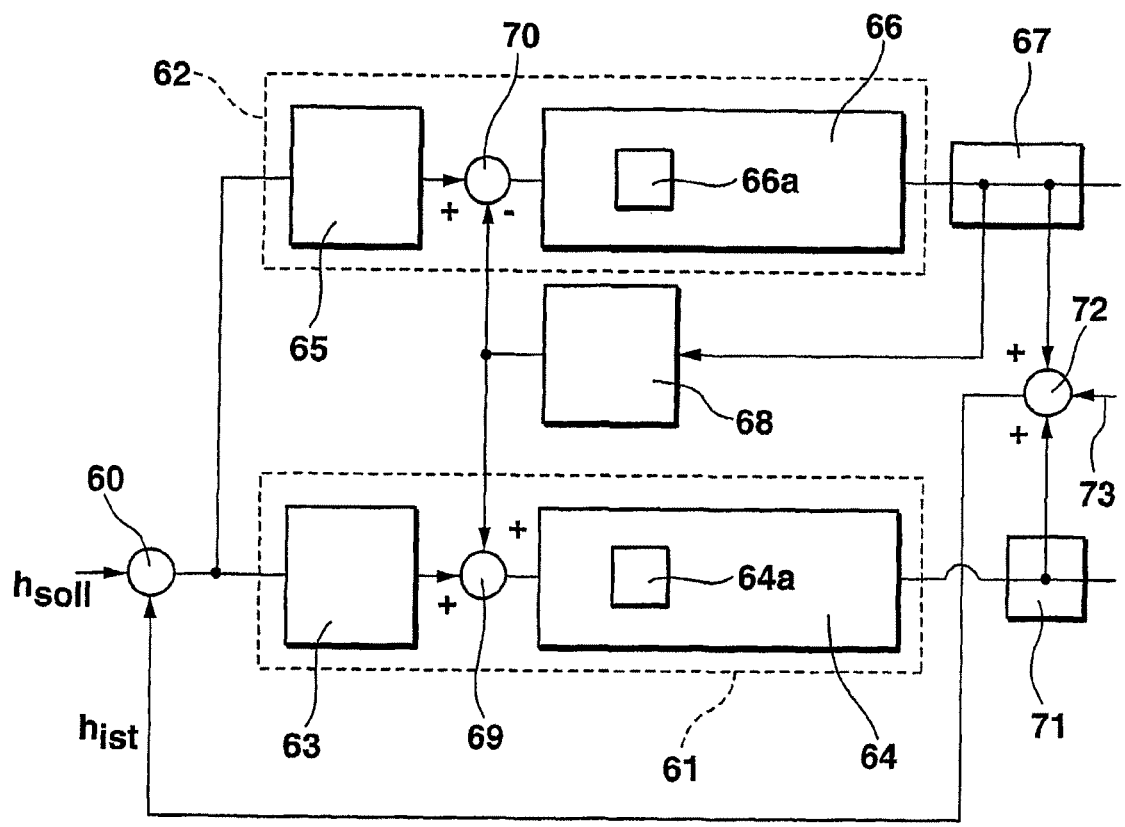
FIG. 7 shows a block diagram to illustrate the control concept for a basic axis and an additional axis taking account of additional influencing variables.

FIGS. 6-7 illustrate examples of control systems that may be used in machine tools, for example the tools shown in FIGS. 1-5, to implement the methods described herein. These control systems include first, second and third controllers as discussed above.

FIG. 6 shows a simplified exemplary embodiment of the controller structure, which can implement the basic idea of the method according to the invention. A setpoint value $h_{soll}$ is inputted into a comparison device 60. This setpoint value is compared in comparison device 60 with an actual value $h_{ist}$. The deviation is fed both to a basic axis control system 61 as well as to an additional axis control system 62. Basic axis control system 61 comprises a first controller 63, which generates from the deviation an actuating variable for a basic axis 64, which comprises at least one drive 64a.

Additional axis control system 62 comprises a second controller 65, which generates from the deviation a second actuating variable for an additional axis 66, which comprises at least one drive 66a. First and second controllers 63, 65 are designed as position controllers.

An actual value of additional axis 66, for example a position of the tool along its traverse path within additional axis 66, is measured in a device 67 for measuring the actual value of the additional axis. This actual value is fed to a third controller 68, which is designed as a follow-up-controller. Third controller 68 determines an actuating variable in such a way that additional axis 66 statically assumes a preset position. This is intended to mean that, for example, the tool movable by means of additional axis 66 statically assumes a preset position along its traverse path within additional axis 66. The actuating variable thus determined is fed diametrically opposed to basic axis control system 61 and additional axis control system 62. This means that the actuating variable determined by third controller 68 is added in a combination element 69 of basic axis control system 61 to the actuating variable determined by first controller 63 and the resultant actuating variable is fed to basic axis 64. In contrast with this, the actuating variable determined by third controller 68 is subtracted in combination element 70 from the actuating variable determined by the second controller and the resultant actuating variable is fed to additional axis 66.

The resultant actuating variables can be fed directly to one or more drives 64a, 66a of additional axis 66 or basic axis 64. It is however also conceivable that the actuating variables are fed to corresponding devices for implementing the movements described by the actuating variables. For example, an NC control can be provided in basic axis 64 as one such device, said NC control distributing the movement of basic axis 64 by suitable transformation to a plurality of fundamental axes and controlling their drives in such a way that the desired movement of basic axis 64 arises.

The position of the basic axis, for example the point at which the additional axis is fixed, is measured in a device 71 for measuring the actual value of the basic axis. The measured value is fed just like the measured value of device 67 for measuring the actual value of the additional axis to an element 72 for determining the actual value. The overall position of the axis assembly, which is fed to comparison device 60, arises from this.

In the case of a distance control (FIG. 7), measured value $h_{ist}$ is composed of the overall position of the axis assembly and an additional influencing variable (indicated by arrow 73), e.g., a deviation between the actual height profile of the workpiece and the height profile of the workpiece stored in the NC program.

A number of embodiments of the invention have been described. Nevertheless, it will be understood that various modifications may be made without departing from the spirit and scope of the invention. Accordingly, other embodiments are within the scope of the following claims.

What is claimed is:

1. A method for adjusting the relative position, relative movement, or both, between a workpiece and a tool of a machine tool, the method comprising:
   generating a first actuating variable for a basic axis in a first controller of a basic axis control system, wherein the basic axis comprises one or more drives acting in a first direction with a first dynamic movement;
   generating a second actuating variable for an additional axis in a second controller of an additional axis control system, wherein the additional axis comprises at least one drive acting in the first direction with a second dynamic movement that is higher than the first dynamic movement; and
   generating a third actuating variable, which is fed both to the additional axis control system and to the basic axis control system, in a third controller;
   wherein a combined movement of the basic axis and the additional axis in the same direction results in an adjustment of the relative position, relative movement, or both, between the workpiece and the tool of the machine tool.

2. The method according to claim 1, characterized in that the third actuating variable is determined in the third controller in such a way that the tool or workpiece disposed on the additional axis assumes a preset position with respect to its traverse path on the additional axis.

3. The method according to claim 2 wherein the preset position is a central position.

4. The method according to claim 1, further comprising detecting an actual value of the additional axis and feeding the actual value to the third controller.

5. The method according to claim 1, wherein the actuating variable of the third controller is fed diametrically opposed to the basic axis control system and to the additional axis control system.

6. The method according to claim 1, further comprising summing the actuating variable of the first controller and the actuating variable of the third controller in the basic axis control system and feeding the sum as a resultant actuating variable to the basic axis, and subtracting the actuating variable of the third controller from the actuating variable of the second controller in the additional axis control system and feeding the difference as a resultant actuating variable to the additional axis.

7. The method according to claim 1, further comprising assigning a setpoint value ($h_{soll}$) for the relative position and/or relative movement, determining an actual value ($h_{ist}$) for the relative position and/or relative movement, and feeding the difference between the setpoint value and actual value as an input variable to the first and second controllers.

8. The method according to claim 1, characterized in that the first and second controller perform a position control and the third controller performs a follow-up-control.

9. The method according to claim 1, further comprising carrying out a transformation for distributing a basic axis movement to a plurality of fundamental axes on the basis of a resultant actuating signal for the basic axis.

10. A machine tool comprising:
    a basic axis control system, comprising a first controller for determining an actuating variable for a basic axis, the basic axis comprising one or more drives for the movement of a tool or a workpiece in an axis direction,
    an additional axis control system, comprising a second controller for determining an actuating variable for an additional axis, the additional axis comprising one or more drives for the movement of a tool or workpiece in the same axis direction, wherein a dynamic movement of the additional axis is higher than a dynamic movement of the basic axis, and a third controller for generating a third actuating variable, the third actuating variable being fed both to the basic axis control system and to the additional axis control system, wherein the basic axis and the additional axis are connected mechanically one behind the other.

11. The machine tool according to claim 10, further comprising a device configured to measure an actual value of the additional axis and to feed an actual variable of the additional axis control system to the third controller.

12. The machine tool according to claim 10, characterized in that the first and second controllers are position controllers and the third controller is a follow-up-controller.

13. The machine tool according to claim 10, characterized in that the basic axis control system comprises a first combination element, in which an actuating variable for the basic axis is determined from the actuating variables of the first controller and the third controller, and the additional axis control system comprises a second combination element, in which an actuating variable for the additional axis is determined from the actuating variables of the second and third controller.

14. The machine tool according to claim 10, further comprising a comparison device configured to generate a deviation between a setpoint value ($hs_{oll}$) and an actual value ($h_{ist}$) and to feed the deviation to the basic axis control system and to the additional axis control system.

15. The machine tool according to claim 14, further comprising a device for measuring an actual value of the basic axis, and an element for determining the actual value $h_{ist}$, the element being connected to the device for measuring the actual value of the basic axis, and also being connected to a device for measuring the actual value of the additional axis, wherein the element is configured to determine the actual value $h_{ist}$ fed to the comparison device.

16. A machine tool comprising:
a basic axis control system comprising a first controller for determining an actuating variable for a basic axis, wherein the basic axis comprises one or more drives for moving a tool or a workpiece in an axis direction;

an additional axis control system comprising a second controller for determining an actuating variable for an additional axis, wherein the additional axis comprises one or more drives for moving the tool or workpiece in the same axis direction, and wherein the basic axis and the additional axis are connected mechanically one behind the other so that movement of the additional axis acts in the same direction as movement of the basic axis;

a third controller for generating a third actuating variable, wherein the third actuating variable is fed both to the basic axis control system and to the additional axis control system;

a first device for measuring the actual value of the basic axis;

a second device for measuring the actual value of the additional axis;

an element for determining an actual value $h_{ist}$, wherein the element is connected to the first device and to the second device, and wherein the actual value $h_{ist}$ comprises an overall position value of the basic axis and the additional axis based on the actual value of the basic axis and the actual value of the additional axis; and a comparison device configured to generate a deviation between a setpoint value $hs_{oll}$ and the actual value $h_{ist}$, and to feed the deviation to the basic axis control system and to the additional axis control system.

* * * * *

UNITED STATES PATENT AND TRADEMARK OFFICE
CERTIFICATE OF CORRECTION

PATENT NO.        : 7,869,898 B2
APPLICATION NO.   : 12/171774
DATED             : January 11, 2011
INVENTOR(S)       : Wolfgang Scholich-Tessmann Page 1 of 1

It is certified that error appears in the above-identified patent and that said Letters Patent is hereby corrected as shown below:

In Claim 14, delete "$(hs_{oll})$" and insert --$(h_{soll})$--.

In Claim 17, delete "$(hs_{oll})$" and insert --$(h_{soll})$--.

Signed and Sealed this
Fifth Day of April, 2011

David J. Kappos
*Director of the United States Patent and Trademark Office*

UNITED STATES PATENT AND TRADEMARK OFFICE
CERTIFICATE OF CORRECTION

PATENT NO. : 7,869,898 B2  
APPLICATION NO. : 12/171774  
DATED : January 11, 2011  
INVENTOR(S) : Wolfgang Scholich-Tessmann Page 1 of 1

It is certified that error appears in the above-identified patent and that said Letters Patent is hereby corrected as shown below:

Column 9, line 30 (Claim 14, line 3) delete "($hs_{oll}$)" and insert --($h_{soll}$)--.

Column 10, line 33 (Claim 16, line 29) delete "($hs_{oll}$)" and insert --($h_{soll}$)--.

This certificate supersedes the Certificate of Correction issued April 5, 2011.

Signed and Sealed this  
Third Day of May, 2011

David J. Kappos  
*Director of the United States Patent and Trademark Office*